Figure 1:
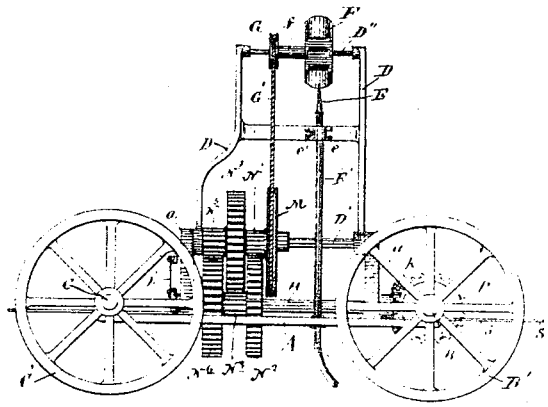

(No Model.)

G. CARLSON.
LAWN SPRINKLER.

No. 484,294. Patented Oct. 11, 1892.

Witnesses.
A. H. Opsahl.
Frank D. Merchant.

Inventor.
Gabriel Carlson
By his Attorney.
Jas. F. Williamson

UNITED STATES PATENT OFFICE.

GABRIEL CARLSON, OF MINNEAPOLIS, MINNESOTA.

LAWN-SPRINKLER.

SPECIFICATION forming part of Letters Patent No. 484,294, dated October 11, 1892.

Application filed September 4, 1891. Serial No. 404,686. No model.

*To all whom it may concern:*

Be it known that I, GABRIEL CARLSON, a citizen of the United States, residing at Minneapolis, in the county of Hennepin and State of Minnesota, have invented certain new and useful Improvements in Lawn-Sprinklers; and I do hereby declare the following to be a full, clear, and exact description of the invention, such as will enable others skilled in the art to which it appertains to make and use the same.

My invention relates to water-sprinklers. It was especially designed as a lawn-sprinkler, but is capable of general application for many other uses, such as sprinkling gardens.

It has for its object to provide a sprinkler capable of automatically distributing the water over a relatively-large area with a relatively-small amount of attention as compared with existing devices for the purpose. To this end I provide a sprinkler which is automatically made to travel over the ground to be sprinkled by the pressure of the water, and the construction is such that the machine may be made to pursue a definite path, variable at will, and also such that a wide distribution is given to the stream on opposite sides of the line of travel.

As its essential features, the sprinkler comprises a supporting-frame movable over the ground, a discharge-section of hose or tubing secured on the frame and in communication with a supply of water under pressure, and propelling mechanism operated by the discharge from the said hose or tubing to propel or give travel to the supporting-frame. Broadly viewed, the frame or support may be of any suitable kind as long as it is movable over the ground, and the propelling mechanism may be of any suitable construction adapted to utilize the water-pressure to propel the machine. In my preferred construction, however, I employ as my preferred means of utilizing the pressure a water-wheel operated by the discharge from the hose and place wheels under the frame, to which the power from the water-wheel is applied, through suitable connecting devices, to propel the machine. The frame and its wheels constitute a truck or carriage supporting the hose and the propelling mechanism. To gain the requisite power from the small water-wheel, it is driven at a high rate of speed, and a train of reducing-gear is interposed as part of the drive between the water-wheels and the truck-wheels. The drive or gearing which connects the water-wheels to the truck-wheels includes as one of its elements a reversing-gear for reversing the direction of the sprinkler's travel. The reversing-gear is controlled by a reversing-lever adapted to be tripped to shift the gear by a projection or obstruction in the path of the machine. The sprinkler is thereby made to automatically reverse the direction of its travel at any desired fixed limit, which may be varied at will. The hose or discharge-tube is set to discharge against the water-wheel for driving the same and spraying the water. Both the water-wheel and the discharge-nozzle are carried by a bracket-like vertical support, which is pivotally connected to the main frame and through suitable devices operated from the water-wheel is given a rocking motion, thereby swinging the discharge-nozzle and the wheel at right angles to the line of travel and distributing the water to a considerable distance on both sides of the same. The sprinkler may either be left free to move back and forth over the ground between the fixed limits or obstructions, which reverse its direction of travel, or it may be restrained and guided to move in any definite path, variable at will. It may be guided in this way by a rope made to engage with some part of the frame or truck. I have shown for the purpose a rope loosely laid on the ground in engagement with the grooved wheels at one side of the truck. It is obvious that the rope might be stretched taut and made to pass through an eye on some part of the frame. It is equally obvious that if grooved wheels be used on the truck any other form of track might be substituted for the rope. The rope used as a ground-track is, however, the most convenient, as it may be curved at any point and is readily removable to different positions to vary the course of the machine.

The preferred form of my invention is illustrated in the accompanying drawings, wherein like letters referring to like parts throughout—

Figure 2:
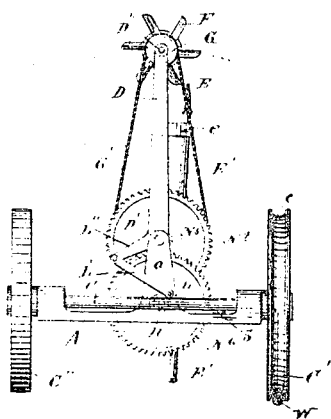
Figure 3:
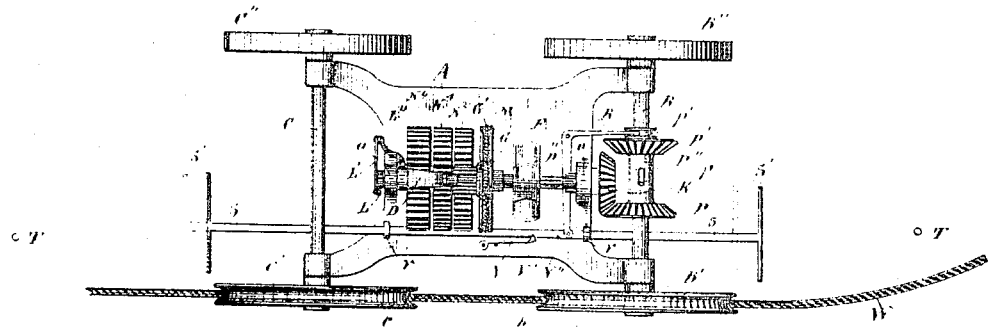

Figure 1 is a right-side elevation, Fig. 2 a rear elevation, and Fig. 3 a plan, of the machine.

A B B' B'' C C' C'' represent the truck, of which A is the frame proper, B B' B'', respectively, the driving-axle and its wheels, and C C' C'' the rear axle and its wheels.

D is the vertical support for the nozzle and the water-wheel, pivoted at its lower end on the shaft D', secured in short standards a, projecting from the main frame.

E is the nozzle or discharge-section of the hose, in communication by the flexible section E' with the water main or pipe containing water under pressure. The nozzle is held in proper position on the support D in any suitable way, as by a pivoted clasp e and a thumb-screw e'. It passes up through a suitable hole in the frame A.

F is the water-wheel, loosely mounted on the top rung or cross-shaft D'', fixed to the support D, and carrying on its sleeve f the grooved driving-pulley G. Mounted in suitable bearings on the frame A, below and parallel with the cross rod or shaft D', is a driving-shaft H, having on its forward end a bevel-gear K and on its rear end a crank-arm L. The crank-arm L is connected by a link L' with a crank-arm L'', projecting from the bracket or nozzle-support D. Motion is imparted to the driving-shaft H from the water-wheel and driving-pulley G through speed-reducing mechanism comprising the pulley M, over which and the driving-pulley G passes the driving-belt G' and a train of reducing-gears N', N², N³, N⁴, N⁵, and N⁶. Of these N' is a pinion on the pulley M, N³ is a pinion on the gear N², and N⁵ a pin on the hub of the gearing N⁴. The said gears and their pinions are all loose on their respective supporting-shafts; but the gearing N⁶ is rigid with its shaft H and imparts motion thereto.

P P' are a pair of bevel-gears fixed to the opposite ends of a sleeve P''', mounted on the driving-axle B, with which it is connected by a slot and pin, as shown at p. The sleeve and its bevel-gears are therefore free to slide on the shaft or axle, but will cause the axle to turn therewith. The bevel-gears P and P' are in position so that one or the other will always engage with the bevel-gear K on the forward end of the shaft H. One of these bevel-gears, as P', is provided with a slotted hub, as shown at p', which is engaged by the pronged arm of the bell-crank lever R, pivoted to the frame at its angle and having its other arm connected to the reversing-lever or tripping-bar S. The tripping-bar S works through keepers r on the truck-frame and is of a length to project beyond the axles of the truck. At its opposite ends it is formed T-shaped or provided with lateral extensions, as shown at S', for co-operation with a movable stick or projection T, which may be placed in its path to shift the sleeve P''' and its bevel-gears to reverse the direction of the machine's travel. The tripping-bar S is held in its extreme positions by a spring-pawl V, which engages with corresponding notches V' and V'' in the tripping-bar. The pawl has a head with bevel-faces, so that it will be thrown out of engagement by the cam action of the tripping-bar in whichever way the bar may be moved. As shown in Fig. 3 of the drawings, the machine would move toward the right. If the tripping-bar be moved toward the rear into its dotted-line position, the gear P' would be thrown into mesh with the gear K and the machine driven in the opposite direction. The projections T are located in the path of the tripping-bar S at the opposite limits of the machine's travel, and the obstruction thereby interposed is sufficient under the momentum of the car to move the tripping-bar and shift the reversing-gear.

W is the rope track or guide represented as in engagement with the right wheels B' and C' of the truck, which are grooved, as shown at b and c, respectively.

The operation of the machine is obvious. The machine will be propelled by the water-wheel backward and forward between the obstructions T. At the same time the nozzle and the water-wheel will have an oscillating motion imparted from the shaft H through the cranks L L'' and the link L', swinging the same laterally across the line of travel and distributing the water to a considerable distance at each side of the same. When the rope W is employed, the line of travel may take any irregular course desired, according to the position in which the rope is laid. Of course it will be understood that the flexible section E' of the hose connecting the nozzle with the water-pipe must be of sufficient length to permit the desired travel of the machine. Whenever a given tract or belt of the ground has been sprinkled to the desired extent, the obstructions T are removed to the opposite ends of another tract and the machine set to work on that. If the rope track be employed, that will also be removed to guide the sprinkler in its new course. A sprinkler constructed in this way will traverse any ordinary lawn, the power developed being quite sufficient to drag the hose for a distance of one hundred feet or more.

It will be understood that many modifications in the construction and arrangements of the different parts illustrated in the drawings might be made without departing from the principle and spirit of my invention. Thus the frame of the machine may be supported upon any suitable running-gear, the form and location of the water-motor may be varied, and different power-transmitting mechanism may be interposed between the motor and the running-gear. I believe that I am the first to construct a lawn-sprinkler which will automatically travel upon the ground to be sprinkled in any desired course.

What I claim, and desire to secure by Letters Patent of the United States, is as follows:

1. A sprinkler comprising a truck movable over the ground, a discharge-nozzle carried by the truck, a flexible hose of sufficient length to permit the travel of the sprinkler, connecting said nozzle to a supply of water under pressure, a water-wheel mounted on the truck operated by the discharge from the nozzle and adapted to serve both as a power-wheel and a spraying device, and a drive or gearing for conveying motion from the said water-wheel to the truck-wheel to propel the truck, substantially as described.

2. The combination, with the truck movable on the ground, of the discharge-nozzle carried by the said truck, the flexible hose of sufficient length to permit the travel of the sprinkler, connecting the said nozzle with a fixed pipe containing water under pressure, the water-wheel mounted on the said truck and adapted to be actuated by the discharge of water from the said hose and serve both as a power-wheel and sprayer, a drive or gearing for conveying motion from the said water-wheel to the truck-wheels, including as one of its elements a reversing-gear, and a reversing-lever for shifting said gear, adapted to be tripped or operated by an obstacle in the path of the truck to reverse the direction of travel, substantially as described.

3. The combination, with the truck movable over the ground, of the pivoted support carried by said truck, the discharge-nozzle and the water-wheel mounted on said pivoted support, the flexible hose connecting the said nozzle with the water-supply pipe and of sufficient length to permit the travel of the sprinkler, the drive or gearing for transmitting motion from the said water-wheel to the truck-wheel, and the rocking connections from said support to the said drive or gearing, arranged to swing the said support transversely to the line of travel, substantially as and for the purpose set forth.

4. The combination, with the truck movable over the ground, of the pivoted support carried by the truck, the discharge-nozzle and the water-wheel mounted on said pivoted support, the flexible hose connecting the said nozzle with the water-supply pipe, a driving-shaft on the truck-frame, connected to the truck-wheels, a counter-shaft also located on said truck-frame and forming the pivotal connection between the said support and the said truck-frame, a train of reducing-gears connecting the said shafts, driving connections between the water-wheel and the counter-shaft, a crank-arm on the lower end of the said pivoted support, and a rod connecting the said crank-arm to a crank on the said driving-shaft, substantially as and for the purpose set forth.

5. The combination, with an automatically-traveling sprinkler having a water-motor and one or more grooved truck-wheels, of a flexible pipe for supplying water to the motor and a flexible rope or cable resting upon the ground, the said truck-wheels being adapted to run upon and be guided by the cable, whereby the sprinkler may be directed in any desired course, substantially as described.

6. The combination, with the truck movable over the ground, of the discharge-nozzle and the flexible section of hose carried by the truck, the water-wheel operated by the discharge from the said nozzle and serving both as a power-wheel and a sprayer, and driving connections from the said water-wheel to the truck-wheel, including as elements thereof a train of reducing-gears for converting the speed of the water-wheel into power with slow motion on the truck, substantially as and for the purpose set forth.

7. The combination, with the truck movable over the ground, of the pivoted support carried by the truck-frame, the discharge-nozzle and the water-wheel on said pivoted support, a train of gearing on the truck-frame for operating the truck-wheels, and driving connections between the water-wheel and the train of gears for communicating motion and permitting a swinging movement to the said support without disturbing the driving connections, substantially as described.

In testimony whereof I affix my signature in presence of two witnesses.

GABRIEL CARLSON.

Witnesses:
JAS. F. WILLIAMSON,
EMMA F. ELMORE.